United States Patent

Smith

[15] 3,683,203

[45] Aug. 8, 1972

[54] ELECTRONIC SHIFT REGISTER SYSTEM

[72] Inventor: Kent F. Smith, Salt Lake City, Utah

[73] Assignee: General Instrument Corporation, Salt Lake City, Utah

[22] Filed: Sept. 8, 1969

[21] Appl. No.: 855,992

[52] U.S. Cl. ................307/221 C, 307/251, 307/279, 307/304

[51] Int. Cl. ..............................................G11c 19/00

[58] Field of Search...307/304, 205, 215, 221 A–221 C, 307/246, 251, 279; 328/37

[56] References Cited

UNITED STATES PATENTS

| | | | |
|---|---|---|---|
| 3,406,346 | 10/1968 | Wanlass | 307/221 C |
| 3,431,433 | 3/1969 | Ball et al. | 307/221 C |
| 3,513,329 | 5/1970 | Washizuka et al. | 307/304 |
| 3,522,454 | 8/1970 | Gilmour | 307/251 |

*Primary Examiner*—John S. Heyman
*Assistant Examiner*—R. E. Hart
*Attorney*—Maxwell James and Harold James

[57] ABSTRACT

A controlled, regenerative, feedback is utilized to connect the output potential of a data input transfer stage of a shift register circuit to the control terminal of an output transfer stage of a preceeding shift register circuit that is connected therewith in series. The feedback permits control by expanded pulses of indefinite time length and any polarity, thereby greatly increasing the usefulness of such shift registers. With this arrangement the manufacture and use of identical, single-stage circuit modules that may be connected in series for greater flexibility in designing electronic shift register systems is greatly simplified.

12 Claims, 2 Drawing Figures

INVENTOR:
KENT F. SMITH
BY: B. Dean Biddle
ATTORNEY

ELECTRONIC SHIFT REGISTER SYSTEM

BACKGROUND OF THE INVENTION

1. Field of the Invention

This invention relates to electronic shift register systems, and particularly to those systems comprising a series of data transfer stages, any two adjacent ones of which may form a bi-stable circuit, unrestricted with respect to time.

2. Prior Art

Electronic shift register systems are well known logic components having many uses. In computers, they are especially useful in temporary memory and time delay functions. They incorporate flip-flop circuits and, being bi-stable devices, are able to retain data signals indefinitely under appropriate conditions. Time delay is achieved by transferring a datum signal, for example, from state to stage of a series of transfer stages in successive time intervals. U.S. Pat. No. 3,406,346 issued Oct. 1968, to Frank M. Wanlass, for example, contains an excellent description of the type of shift register system to which the present invention relates.

In order to transfer a given signal from stage to stage of the system, each transfer stage of the system is isolated by switch means and each switch means is operated by a control pulse of discrete time duration. Switches in the series connection are operated consecutively with no two adjacent switches being "on" at the same time. Such systems are particularly adapted to use as micro- or integrated circuits which utilize the inherent small time intervals that elapse between consecutive applications of control voltage to prevent simultaneous initiation of otherwise concurrently applied control pulses. The resulting small discontinuities of current are filled by drainage from inherent or strategically located capacitors. As mentioned in the previously cited U.S. patent, field effect transistors function well in shift register systems, because they not only operate as exceptionally high speed switches, but also incorporate appropriate resistances; and, in addition, their output terminals provide sufficient capacitance to maintain data signals during the particular current discontinuities described. This eliminates the need for physically separate capacitors in most instances.

In the type of two-stage shift register shown in U.S. Pat. No. 3,406,346, the second stage is cut off by switches when the first stage is in operation and its input switch is "on". This means that a previously transferred datum signal is retained in the second stage because of the drainage of the inherent capacitance of field effect transistor. The decay period of the inherent capacitance therefore limits the length of time that the input switch may be closed. If the input switch is "on" too long, the datum signal in the second stage will be lost. Hence, the pulse width of the control voltage operating the input switch must not exceed a set time limit. While the shift register described in the cited patent is highly useful and an important advance in the art, its usefulness and range of application are somewhat restricted by this limitation.

SUMMARY OF THE INVENTION

The present invention, which is intended to overcome the limitation upon the nature of the control pulses such as noted in connection with the prior art, comprises the addition of a controlled, regenerative, feedback connecting the data output stage of a following shift register of the type described in U.S. Pat. No. 3,406,346 to the control of an intermediate switch of a preceeding register of the same type. This removes the pulse-width limitation noted previously for the control pulse operating the input switch, and makes the circuit useful for many additional applications. The control voltage or clock pulse operating the input stage can be of any time duration, i.e. any clock symmetry and even a continuous direct current can be use. The resulting circuit symmetry permits manufacture of identical single stage integrated circuits that may be connected in series, thereby not only simplifying circuit manufacture but also giving greater design flexibility. A special "end" stage is provided for connection to outside equipment.

An excellent example of an application that can be performed by the invention, but not by the prior art shift registers, is found in a square-wave frequency divider wherein the voltage frequency alternating between ground and a negative potential may be slowed down to any desired extent. Obviously, this could not be done if the negative potential, for example, was limited by the inherent decay time of a small controlling capacitor.

Objects of the present invention, therefore, are to provide an electronic shift register system that has much greater utility and a greater range of application than have those of the prior art. Important features of the invention are that it can use various kinds of clocks or sources of control pulses, even those producing a direct current, and that it permits the manufacture and use of modular single stages of identical design for use in series of any desired length.

Additional objects and features of the invention will become apparent from the following detailed description and drawings disclosing what is presently contemplated as being the best mode of the invention.

DESCRIPTION OF THE PREFERRED EMBODIMENTS

Figure 1:
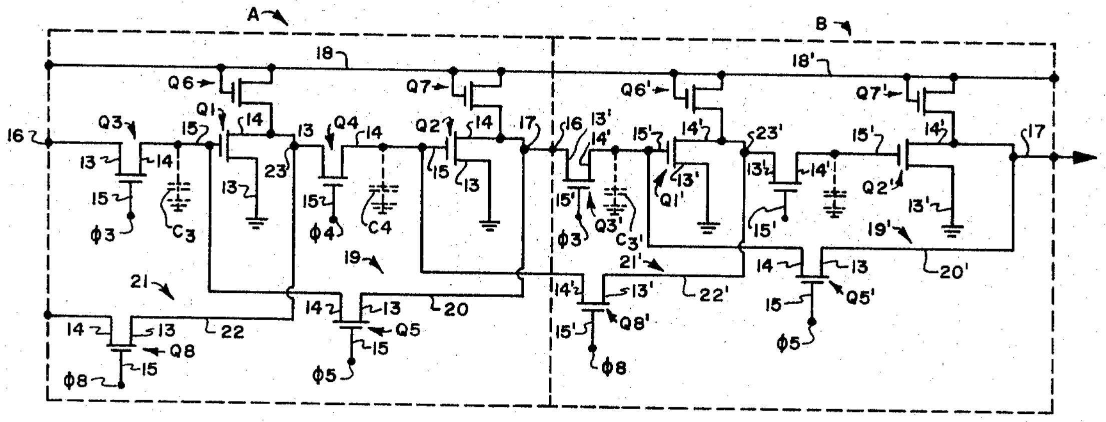
FIG. 1 is a schematic diagram of two shift registers of the type shown in U.S. Pat. No. 3,406,346 connected in series and incorporating the invention.

FIG. 1 shows two identical shift register circuits, each having two transfer stages, and connected in series as described above. It will be noted that the system is made entirely of field effect transistors connected together in various ways. Each field effect transistor shown has two output terminals arbitrarily called the "-source" 13 or 13' and the "drain" 14 or 14', depending upon their functions in the circuit. The third terminal is called the "gate" or "control terminal" 15 or 15'. When the gate is energized with a negative potential it closes the circuit between the two output terminals 13 or 13' and 14 or 14' respectively, to provide a low resistance path between the terminals in a space which otherwise functions as a high resistance. Therefore, the transistor may be used as a switch.

Referring to FIG. 1, each of the two shift register circuits, designated A and B and enclosed in broken lines for clarity, has an input point 16 and an output point 17. Since they are identical circuits, the components of register circuit A are designated by reference numerals and corresponding parts in register circuit B are designated by corresponding prime numbers. It is to be understood that the two circuits function in an identical manner and that description of the operation of circuit A shall be considered as a description of circuit B, also.

The two inverting transfer stages of register circuit A are represented by transistors $Q_1$ and $Q_2$, each connected such that their drain terminals 14 are respectively connected to a reference voltage line 18 through transistors $Q_6$ and $Q_7$, which function primarily as resistances, and with a source terminal 13 connected to ground. The stages $Q_1$ and $Q_2$ are isolated from one another by controlled switches $Q_3$ and $Q_8$ and $Q_4$ and $Q_5$. Switches $Q_4$ and $Q_5$ are controlled concurrently by conventional "clocks" or sources $\phi_4$ and $\phi_5$ respectively, of periodic control voltages. These control pulses, or voltages are essentially square waves alternating from negative to ground potential. Similarly, switches $Q_3$ and $Q_8$ are operated concurrently by clocks $\phi_3$ and $\phi_8$; but 180 out of phase with switches $Q_4$ and $Q_5$, so that the set of switches $Q_3$ and $Q_8$ is never "on" at the same time as the set of switches $Q_4$ and $Q_5$. Very short time periods elapse between activations of the two sets of switches, and during these time periods the drainage of residual interterminal capacitances of the transistors here represented in broken lines as capacitors $C_3$ and $C_4$ normally extend the state of their associated transistors. These capacitors could, of course, be physically distinct components, if for some reason longer time periods are required during phase shifting of the clocks.

In accordance with the teachings of the previously mentioned U.S. Pat. No. 3,406,346, the two transfer stages $Q_1$ and $Q_2$ are joined by a feedback or locking circuit 19, the output potential of the drain terminal 14 of transistor $Q_2$ being fed back to the gate terminal 15 of $Q_1$ via line 20 and switch $Q_5$. The present invention includes a similar feedback or locking circuit 21, whereby the potential of drain 14' of the input stage $Q_1'$ of shift register B is fed back to the gate 15 of the output stage $Q_2$ of shift register A via a line 22' and switch $Q_8'$. This enables a previously received datum signal to be stored indefinitely regardless of the pulse length of the clock system used.

In operation of the system, a datum signal of either ground or negative potential is typically presented at the input point 15 of shift register A. The clock $\phi_3$ then furnishes a negative voltage pulse of predetermined time duration to the gate 15 of switch $Q_3$. If the datum signal is negative, it energizes the gate 15 of switch $Q_1$ closing that switch so that the junction point 23, connected to the drain 14 thereof assumes ground potential.

When the negative pulse to the gate 15 of $Q_3$ is terminated, first clock $\phi_4$ and thereafter clock $\phi_5$ apply negative pulses to gates 15 of switches $Q_4$ and $Q_5$, respectively, thereby closing them as switch $Q_3$ is opened in response to its gate potential becoming ground. The datum signal (now at ground potential) is thus transferred from point 23, through $Q_4$, to the gate 15 of switch $Q_2$, closing this switch and causing the output point 16 to approach the negative potential of the line 17. This potential is fed back through the line 20 and the closed switch $Q_5$ to the gate 15 of switch $Q_1$, to latch the switch. The potential may then be circulated through the system, for so long as a negative voltage is supplied by the clocks $\phi_4$ and $\phi_5$ to the gates 15 of switches $Q_4$ and $Q_5$, respectively.

When the clocks $\phi_4$ and $\phi_5$ go to ground potential, whether simultaneously or independently, they thereby open switches $Q_4$ and $Q_5$, so that the datum signal is transferred from the output point 16 of shift register A to the first stage $Q_3'$ of shift register B. This is done when first clock $\phi_3$ and thereafter clock $\phi_8$, respectively, apply negative pulses to the gates 15' of switches $Q_3'$ and $Q_8'$ of register B. The negative datum signal thus furnished to the gate 15' of switch $Q_1'$ of register B closes this switch, causing junction point 23' on its drain terminal to become ground potential. This potential is then fed back through the circuit 21 from point 23', through the closed switch $Q_8'$, via line 22', to the gate 15 of switch $Q_2$ of register A. The datum signal is then both circulated and latched in the second stage $Q_2$ of register A and the first stage $Q_1'$ of register B for so long as the clocks $\phi_3$ and $\phi_8$ supply a continuous negative voltage to the gates 15 of the switches $Q_3'$ and $Q_8'$.

In this manner, the datum signal, whether at negative or ground potential when presented at the input port 15 of shift register A, may be transferred from stage to stage through any number of stages, which number is represented by the parallel connected field effect transistors positioned between the reference voltage line 17 and ground. In similar fashion, an input datum signal at ground potential is transferred through the system. In either case, it should be noted that as the datum signal is transferred through the system, its polarity is changed at the drain terminal of each succeeding transfer stage. Hence, an even number of such stages should be used, if the original polarity of the datum signal is to be preserved.

Figure 2:
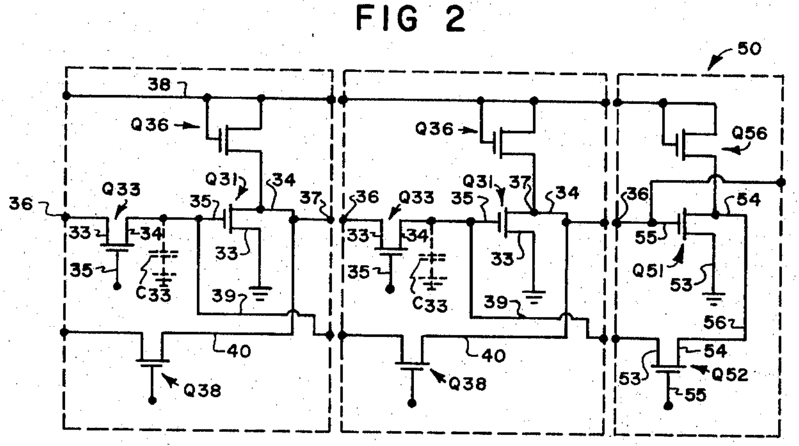
FIG. 2, a schematic diagram showing how the invention permits design of a shift register of any length using a series of identical single stages and a special output stage.

FIG. 2, shows how the resulting improved shift register circuit may be constructed as identical, single-stage modules that may be connected together as a series of any desired length. The polarity of the input datum signal at each input point 36 is always opposite that which appears at the output point 37, i.e., if the input datum signal is at ground potential, the output signal will be negative. When connected in series the circuit made up of combined and connected modules functions in exactly the same way as the series of FIG. 1. In each module a shift register circuit is provided having an inverting transfer stage comprising a transistor $Q_{31}$ connected such that its drain terminal 34 is connected through a resistor transistor $Q_{36}$ to a reference voltage line 38. The other output terminal is connected to ground and a clock operates transistor switch $Q_{33}$ is connected between the input point 36 and the gate 35. As before, the inherent capacitance of switch $Q_{33}$ is shown in dotted lines at $C_{33}$. Connector terminals for modular connections are provided at each end of line 38, at input 36, at output 37, at one end of a line 39 adapted to connect the gate 35 to a feed back line from the drain 34 of the subsequently connected module and at one end of a line 40 containing a clock operated transistor switch $Q_{38}$ leading from the drain 34.

Since latching or indefinite circulation of a datum signal in any given transfer stage is dependent on the feedback circuit that originates at the drain terminal 34 of the following stage, a special "end" stage must be provided at the output end of the series. This end stage is shown as module 50 in FIG. 2. The end stage module 50 feeds back or latches at gate 35 the signal presented at the drain terminal 34 of the previous stage. Hence, the ultimate output point 37 for the entire series of stages is taken from this drain terminal 34, rather than from the end stage 50. End stage module 50 consists simply of an additional switch or field-effect transistor $Q_{51}$, having a drain terminal 54 connected to the reference voltage line 38 via resistance $Q_{56}$, a source terminal 53 connected to ground and a gate terminal 55 connected to the output point 37 of the previous stage (which is also the output point of the entire series). The feedback circuit line 56 is connected to the drain terminal 54 of switch $Q_{51}$ and connects via switch $Q_{52}$ to a line 39 of the previous module, that is connected to the gate 35 of the previous stage. It will be apparent that the circuit of the end stage module 50 is also applicable to the series of stages shown in FIG. 1, even though not shown connected thereto.

A preferred embodiment circuit of the invention has been disclosed that is particularly useful in comutors, but other uses will be apparent, and it will be apparent that changes can be made within the scope of the following claims.

I claim:

1. In a shift register system comprising a plurality of bits, each bit having an input port and an output port, a given bit having its input port connected to the output port of a previous bit and its output port connected to the input port of a subsequent bit, each bit comprising first and second transfer stages, each transfer stage having an input and an output and adapted to have a different output signal depending upon the input signal thereto, first means for shifting a data signal at said bit input port to said input of said first transfer stage, second means for shifting a data signal at said output of said first transfer stage to said input of said second transfer stage, said bit output port being operatively connected to said output port of said second transfer stage, cyclical control means operatively connected to said shift register system for causing a given data signal at said bit input port to be transferred from said bit input port to said bit output port via said first and second transfer stages, said cyclical control means comprising means for providing first and second alternately operative control signals operatively connected to said first and second shifting means respectively and effective to cause their associated shifting means respectively to effect their respective signal shifts, said first control signal thereby being effective to transfer said data signal from said bit input port to said first stage and said second control signal being effective to transfer said data signal from said first stage to said second stage, first latching means operatively connected between the output of said second stage and the input of said first stage effective to retain said stages in a condition corresponding to the data signal at said bit output port between cycles of said control means, the improvement comprising second latching means operatively connected between the output of said first transfer stage of a given bit and the input of the second transfer stage of the previous bit effective to retain said second transfer stages in a condition determined by the data output signal at the bit output port of said previous stage between cycles of said control means, and to insure unidirectional informational flow.

2. The shift register system of claim 1, in which said second control signal is operatively connected to and is effective to actuate said first latching means.

3. The shift register system of claim 1, in which said first control signal is operatively connected to and is effective to actuate said second latching means.

4. In a shift register system comprising a system input port, first, second and third transfer stages each having an input and an output and each adapted to have a different output signal depending upon the input signal thereto, a first electronic switch connected between said system input port and the input of said first stage, a second electronic switch connected between the output of said first stage and the input of said second stage, a third electronic switch connected between the output of said second stage and the input of said third stage, a system output port, means connecting the output of said third stage to said system output port, control means active on said switches for causing them to become conductive at predetermined times, first feedback means operative between the output of said second stage and the input of said first stage during at least a portion of the time that said first switch is nonconductive and effective to cause said first stage to assume a condition related to that of said second stage in a predetermined manner; the improvement which comprises a second feedback means operative between the output of said third stage and the input of said second stage during at least a portion of the time that said second switch is nonconductive and effective to cause said second stage to assume a condition related to that of said third stage in a predetermined manner, and to insure unidirectional informational flow.

5. The system of claim 4, in which said control means is active to cause said first and third switches to be conductive together over a first period of time and to cause said second switch to be conductive over a second period of time.

6. The system of claim 4, in which said second feedback means includes an additional electronic switch connected between the corresponding input and output, said control means being active on said additional switch to render it conductive during said operative time of said second feedback means.

7. A shift register system comprising at least three transfer stages each having an input port and an output port, a given stage having its input port connected to the output port of a previous stage and its output port connected to the input port of a subsequent stage, each transfer stage comprising first and second electronic switch means, a reference voltage source, each of said switch means having two output circuit terminals and a control terminal, the output circuit terminals of said first switch means being connected between said input port and the control terminal of said second switch means, the output circuit terminals of said second switch means being connected between said reference voltage source and ground, said output port being connected to the reference voltage side of said second switch means, a control voltage source connected to the control terminal of said first switch means whereby a data signal is transferred from said input port to said output port by the operative effect of said control voltage source, the improvement which comprises a plurality of feedback means operatively connected, respectively, between said output port of each transfer stage and the control terminal of said second switch means of the previous transfer stage thereby to condition said second switch means of said previous stage to be conductive or nonconductive depending upon the nature of the data signal at the output port of the immediately following stage, and to insure unidirectional informational flow.

8. The shift register system of claim 7, in which said feedback means each comprises a third electronic switch means having output circuit terminals and a control terminal, said output circuit terminals of said third switch means being connected between said output port of each transfer stage and said control terminal of said second switch means of said previous stage, said control voltage source being operatively connected to the control terminal of said third switch means and effective to render said third switch means conductive.

9. The shift register system of claim 8, wherein the control terminals of successive first switch means are connected respectively to first and second control voltage sources comprising first and second non-overlapping clock pulses.

10. The shift register system of claim 7, further comprising fourth switch means having a control terminal and two output circuit terminals, said output circuit terminals being connected between said reference voltage source and said output port, said control terminal of said fourth switch means being connected to said reference voltage source.

11. The shift register system of claim 8, further comprising fourth switch means having a control terminal and two output circuit terminals, said output circuit terminals being connected between said reference voltage source and said output port, said control terminal of said fourth switch means being connected to said reference voltage source.

12. The shift register system of claim 9, further comprising fourth switch means having a control terminal and two output circuit terminals, said output circuit terminals being connected between said reference voltage source and said output port, said control terminal of said fourth switch means being connected to said reference voltage source.

* * * * *